Nov. 2, 1965  M. G. CHATELAIN ETAL  3,216,011
MULTI-MODE RADAR
Filed May 29, 1961

INVENTORS
MAURICE G. CHATELAIN
RICHARD D. ZUEFELDT
BY
Knox & Knox

United States Patent Office 3,216,011
Patented Nov. 2, 1965

3,216,011
MULTI-MODE RADAR
Maurice George Chatelain, San Diego, and Richard D. Zuefeldt, Del Mar, Calif., assignors to The Ryan Aeronautical Co., San Diego, Calif.
Filed May 29, 1961, Ser. No. 113,208
3 Claims. (Cl. 343—13)

This invention relates to a multi-mode radar system, and more particularly to one that uses amplifiers that are based on the principle of heterodyning.

Background

As is well known, radar operates on the principle that a signal is sent out; is reflected by a target; and this reflection, or "echo," is detected and compared with the original signal. Since the echo is quite weak, it must be amplified before it is useful.

It has been found that amplifiers have some particularly desirable properties when they use the principle of heterodyning. This principle requires that the amplifier contain a local oscillator, and that the output of this local oscillator be "beat" against the incoming echo. When the signal from the oscillator has a frequency that is different from that of the incoming echo, beating these two signals against each produces a "beat frequency" signal whose frequency is the difference between the frequency of the oscillator and the frequency of the incoming echo. Most amplifier circuits are designed so that this beat frequency is always the same. This permits subsequent stages of the amplifier to be designed to amplify this one frequency, rather than having to amplify a wide range of frequencies.

In radar applications, the frequency of the transmitted signal is fixed, and is carefully maintained by a first oscillator. To produce heterodyning, a second local oscillator is required in order to produce a signal that can be beat against the incoming echo. As may be expected, a great deal of power is required.

To supply this power and provide optimum performance, each oscillator generally has its own power supply; although a single twice-as-large power supply may be used. Ordinarily, the space and weight requirements of the radar equipment are met because of the great value of radar.

Radar is of extreme importance in the design of space and interplanetary vehicles. In these vehicles radar will be used for detecting other space vehicles; detecting solar bodies; determining altitude from earth, the moon, or other planets; arranging satellite rendezvous; and other such uses. These vehicles however, cannot afford the space and weight of two oscillators, two power supplies, and the duplication of accessory equipment. Any reduction of weight and space of the radar system would be extremely desirable.

Weight and space reduction of radar equipment would also be desirable in terrestrial applications, such as automatic altitude sensors; landing devices; mapping; surveying; and the like.

Objects and drawings

It is therefore the principal object of our invention to provide an improved radar system.

It is another object of our invention to provide a radar system that is lighter in weight and more compact in size.

It is a further object of our invention to provide a radar system using only a single oscillator and power supply.

It is still another object of our invention to provide an oscillator that operates in different modes, thus producing a multi-mode radar system.

The attainment of these objects and others will be realized from the following specification, taken in conjunction with the drawings, of which FIGURE 1 shows a graphic display of signals used in our invention;

Brief description of the invention

Broadly stated, our invention contemplates a single oscillator that first produces a first signal of a given frequency that is transmitted as a radar signal. The same oscillator is then caused to produce a second signal at a second frequency. The timing of the second signal and its duration are controlled, so that the second signal can be heterodyned against the radar echo. The resultant beat frequency signal is used in the usual manner.

Detailed description of the invention

Figure 1:
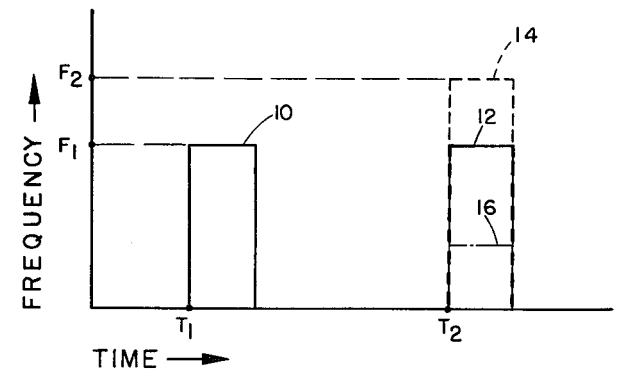

Our invention will be readily understood from FIGURE 1, which shows the time and frequency characteristics used in our improved radar system. As is well known, the usual radar signals are of high frequency, usually in the microwave range. An electron tube known as a "klystron" is generally used as the oscillator; and for convenience this term will be used, although it should not be construed as a limitation.

According to our invention, an oscillator such as a klystron is energized to produce a signal such as 10 of FIGURE 1. Signal 10 has a frequency of F1, and at time T1 is transmitted out into space. The signal is reflected by a target, such as a space ship or the moon, etc., and an echo 12 is received at time T2, the echo 12 having substantially the same characteristics as the transmitted signal.

At this instant, T2, the same klystron is energized to produce a second signal 14, shown by the dashed lines; this second signal 14 having another frequency F2. It will be seen from FIGURE 1 that the second signal 14 is coextensive time-wise with echo 12, but has a different frequency.

Echo 12 and signal 14 are beat against each other to produce a beat frequency signal 16, shown by the broken lines. Signal 16 has a frequency equal to F2 minus F1, and is amplified by subsequent stages in the well known manner.

Thus our invention causes the klystron to act in one manner to produce the transmitted signal, and to act in another manner to produce the second signal that is beat against the incoming echo.

It will be realized that the second signal 14 must be precisely timed in order to be exactly coextensive with echo 12. To avoid the necessity of this precise timing, the concept of FIGURE 2 may be used; this second concept achieving a result similar to that of FIGURE 1.

Figure 2:
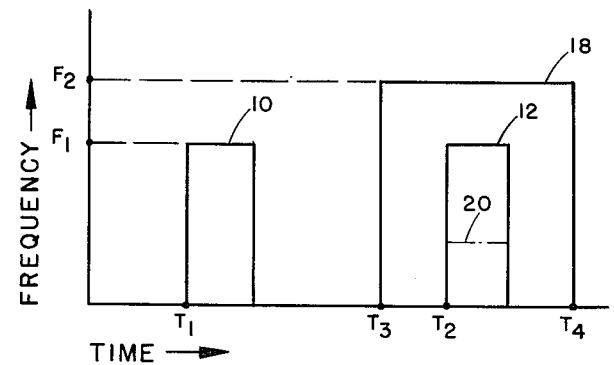
FIGURE 2 shows a second graphic display of signals used in our invention.

In FIGURE 2, a first signal 10 is again produced and transmitted as explained above, and the reflected echo 12 is received at time T2. As shown in FIGURE 2 however, the klystron is energized at some time T3, before echo 12 is received, to produce a signal 18 that has a frequency F2.

Signal 18 terminates at some time T4 after the echo 12 has been received. It will be seen that the timing for the initiation and termination of signal 18 of FIGURE 2 is less exacting than for the initiation and termination of signal 14 of FIGURE 1.

Signal 18 has a frequency that is different from that of signal 10 and echo 12, and also has a different duration. However, it is coextensive with echo 12, and during the coincident interval signal 18 and echo 12 are both available to the equipment. These signals are beat against each other, and produce a beat frequency signal 20 whose frequency is F2 minus F1.

It will be seen that signal 20 of FIGURE 2 is substantially the same as signal 16 of FIGURE 1, and is applied to subsequent stages of the amplifier in the same manner.

In each case, the time interval of interest is the time between T1 (the instant at which the initial pulse was transmitted), and T2 (the instant at which the echo was received). This interval of time was required for signal 10 to reach the target and return therefrom, so this interval is a measure of the distance to the target.

Figure 3:
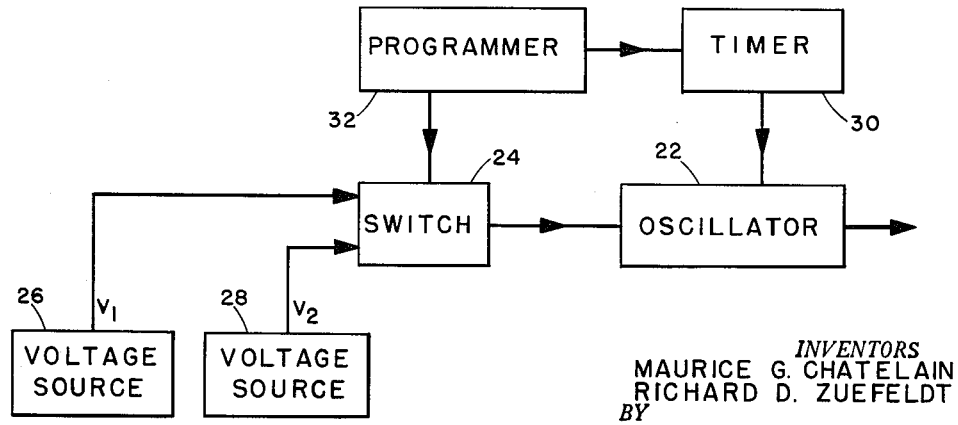
FIGURE 3 shows, in block diagram form, a circuit for practicing our invention.

In FIGURE 3, there is shown a block diagram illustrating the manner in which our invention may be practiced. Here oscillator 22 may be any suitable circuit, or device, such as the aforementioned klystron. This particular device is well known, and its structure, operation, and characteristics are discussed in some detail in "Klystron Technical Manual," published by the Sperry Gyroscope Co. Inc. On pages 66–68 of this book are passages on "Modulation," which teach that the voltages applied to selected electrodes of the klystron will change the frequency of the output signal.

In accordance with these teachings, FIGURE 3 shows that a switch 24 may select a voltage V1 or V2 from either source 26 or source 28, and apply the selected voltage to oscillator 22. These voltages determine the frequency of the oscillator's output.

It will be realized from FIGURES 1 and 2 that the initiation, termination, and duration of signals 14 and 18 have to be controlled; and this is accomplished by a timing circuit 30.

The operation of the entire circuit is in turn controlled by a programmer 32, which may be manual, automatic, or a combination of the two.

The outputs of oscillator 22 are used as previously explained, and in accordance with principles well known in the art.

Advantages

It will now be realized that our invention has numerous advantages over prior-art systems. It is simpler, lighter, more compact, and requires less power and circuitry.

It is understood that minor variations from the form of the invention disclosed herein may be made without departure from the spirit and scope of the invention, and that the specification and drawing are to be considered as merely illustrative rather than limiting.

We claim:
1. In a radar system, the combination comprising:
    an oscillator having an operating frequency dependent on the applied voltage;
    a first voltage source;
    a second voltage source;
    a switch connecting said oscillator sequentially to said first and second voltage sources; and
    a timer timing the interval between connection of said oscillator to said first and second voltage sources to coincide with the predicted time for a pulse to travel to a selected reflecting target at a predetermined range and return.
2. The combination of claim 1 wherein said oscillator is connected to said first and second voltage sources during equal time intervals.
3. The combination of claim 1 wherein said oscillator is connected to said first and second voltage sources during unequal time intervals, time of connection to said second voltage source being greater, whereby the reflected pulse is encompassed within the time of the second pulse.

References Cited by the Examiner

UNITED STATES PATENTS

| | | | |
|---|---|---|---|
| 2,433,669 | 12/47 | Keister | 343—17.2 |
| 2,997,708 | 8/61 | Smith et al. | 343—17.1 X |
| 3,101,470 | 8/63 | Vosburgh | 343—14 |

FOREIGN PATENTS

| | | | |
|---|---|---|---|
| 111,594 | 3/39 | Australia | 343—14 |

CHESTER L. JUSTUS, *Primary Examiner.*